(12) United States Patent
Rothman et al.

(10) Patent No.: US 7,882,341 B2
(45) Date of Patent: Feb. 1, 2011

(54) SYSTEM AND METHOD TO ENABLE PARALLELIZATION OF EARLY PLATFORM INITIALIZATION

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 11/967,613

(22) Filed: Dec. 31, 2007

(65) Prior Publication Data

US 2009/0172379 A1    Jul. 2, 2009

(51) Int. Cl.
*G06F 9/00* (2006.01)
*G06F 9/24* (2006.01)
*G06F 15/177* (2006.01)

(52) U.S. Cl. .................................. 713/1; 713/2
(58) Field of Classification Search ............ 713/1, 713/2
See application file for complete search history.

(56) References Cited

U.S. PATENT DOCUMENTS

| 5,642,506 | A  | * | 6/1997 | Lee ............................... 713/1 |
| 5,938,765 | A  | * | 8/1999 | Dove et al. ..................... 713/1 |
| 6,336,185 | B1 | * | 1/2002 | Sargenti et al. ................ 713/2 |
| 7,194,660 | B2 | * | 3/2007 | Edrich .......................... 714/36 |
| 7,386,711 | B1 | * | 6/2008 | Haimovsky et al. ............ 713/2 |

* cited by examiner

*Primary Examiner*—Mark Connolly
(74) *Attorney, Agent, or Firm*—Joni D. Stutman (57) ABSTRACT

In some embodiments, the invention involves reducing the time required for a platform to boot to its target application/operating-system using parallelization of firmware image content decompression and loading. An embodiment dispatches alternate processing agents as a means to intelligently assist in off-loading some of the initialization tasks so that the main processor may share the burden of boot tasks. In at least one embodiment, it is intended to build firmware images that facilitate parallelization, utilizing co-processing agents that can split these transactions across various processing agents. Other embodiments are described and claimed.

14 Claims, 6 Drawing Sheets

Fig. 1

Before (200)

| Firmware Image #1 ImageBase = 0x00000000 | Firmware Image #2 ImageBase = 0x00000000 | Firmware Image #3 ImageBase = 0x00000000 | Firmware Image #4 ImageBase = 0x00000000 |
|---|---|---|---|
| Firmware Image #5 ImageBase = 0x00000000 | Firmware Image #6 ImageBase = 0x00000000 | Firmware Image #7 ImageBase = 0x00000000 | Firmware Image #8 ImageBase = 0x00000000 |
| Firmware Image #9 ImageBase = 0x00000000 | Firmware Image #10 ImageBase = 0x00000000 | Firmware Image #11 ImageBase = 0x00000000 | Firmware Image #12 ImageBase = 0x00000000 |
| ImageBase= 0x00000000 | ImageBase= 0x00000000 | ImageBase= 0x00000000 | ImageBase= 0x00000000 |

201 → first row; 203 → last cell top row

After (210)

| Firmware Image #1 ImageBase = 0x00010000 | Firmware Image #2 ImageBase = 0x00020000 | Firmware Image #3 ImageBase = 0x00030000 | Firmware Image #4 ImageBase = 0x00040000 |
|---|---|---|---|
| Firmware Image #5 ImageBase = 0x00050000 | Firmware Image #6 ImageBase = 0x00060000 | Firmware Image #7 ImageBase = 0x00070000 | Firmware Image #8 ImageBase = 0x00080000 |
| Firmware Image #9 ImageBase = 0x00090000 | Firmware Image #10 ImageBase = 0x000A0000 | Firmware Image #11 ImageBase = 0x000B0000 | Firmware Image #12 ImageBase = 0x000C0000 |

Fig. 7

SYSTEM AND METHOD TO ENABLE PARALLELIZATION OF EARLY PLATFORM INITIALIZATION

FIELD OF THE INVENTION

An embodiment of the present invention relates generally to initialization of computing systems during boot, and, more specifically, to reducing the time required for a platform to boot to its target application/operating-system using parallelization of FLASH content decompression and loading.

BACKGROUND INFORMATION

Various mechanisms exist for booting a platform from FLASH or other non-volatile memory, especially during the power-on self test (POST) phase of platform restart. Existing systems access the various platform capabilities in a serial, blocking fashion. Existing systems typically load firmware components from compressed images on FLASH memory. FLASH memory is typically slow and relatively expensive to use. During boot, the decompression of images on the FLASH memory and loading of the images is typically the most time consuming of the boot phases. Images are not typically run in place from the FLASH device, because FLASH memory is much slower than system RAM, and the images must be decompressed before running.

There are certain platform classes that require being able to boot in a specific amount of time. This can be a significant challenge when one considers the serial behavior which existing basic input output systems (BIOS) are using. Some of the blocking operations that are executed serially are the decompressing of content from the FLASH device and the subsequent loading of the content into specific memory locations so that the content can be executed. A large portion of the initialization time is spent in this decompression and loading phase.

There are also certain classes of customers that require server platforms to maintain five-9's (e.g., 99.99999%) uptime for the platform. If a platform takes too long to boot, the platform cannot maintain the five-9's designation and will be eliminated as a choice for the customer to consider.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to a means to dispatch alternate processing agents as a means to intelligently assist in off-loading some of the initialization tasks so that the main processor may share the burden of boot tasks. One result of embodiments of the invention is that much of the firmware is posted into memory in its ready-to-execute form without the main processor having to have done the I/O transaction itself. Since the FLASH memory device has typically been one of the slowest I/O components in the platform, this results in a significant improvement in platform boot time. In at least one embodiment, it is intended to build images that facilitate parallelization, utilizing co-processing agents that can split these transactions across various processing agents and significantly improve the speed of the platform boot process.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the example A common standard used in existing personal computer systems to be used for executable images is the portable executable, common object file format (PE/COFF) specification, entitled, *Microsoft Portable Executable and Common Object File Format Specification, Revision* 6.0, Microsoft Corporation, February 1999, and may be found on the World Wide Web at www*Microsoft*com/whda/system/platform/firmware/PECOFF.mspx. It should be noted the periods have been replaced with asterisks in URLs in this document to avoid inadvertent hyperlinks. This format is portable because the formatted file is meant to be executed on different targets. For instance a PE/COFF image might be executed in both a WIN/CE environment, as well as, a Windows® XP environment. As long as the target processor recognizes a PE/COFF format, the processor can execute the PE/COFF formatted image.

Figure 1:
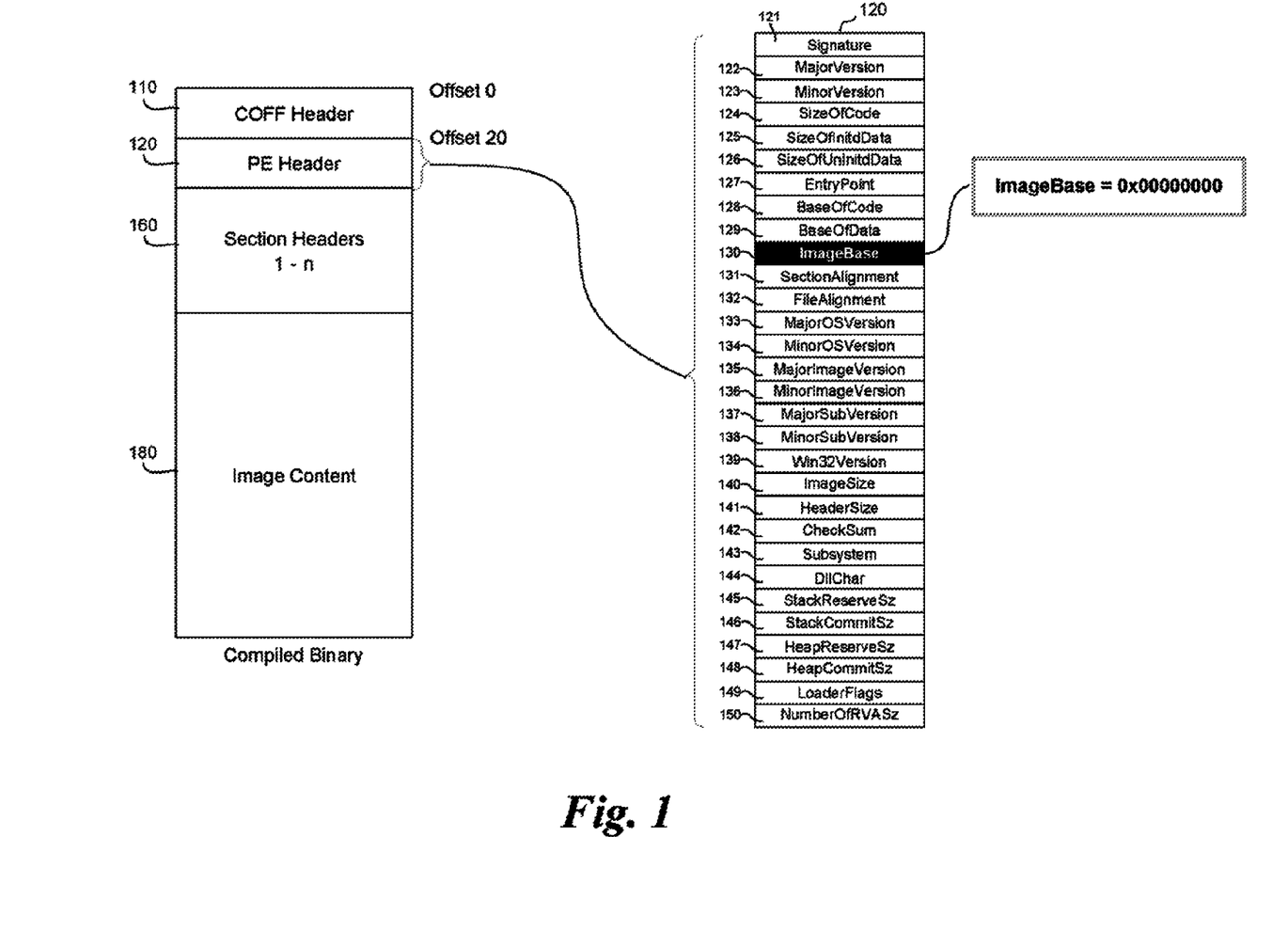
FIG. 1 is a block diagram illustrating an exemplary portable executable, common object file format (PE/COFF) image, according to embodiments of the invention.

Referring now to the drawings, and in particular to FIG. 1, a PE/COFF image is shown. The PE/COFF image comprises a COFF header 110, a PE header 120, section headers 160, and image content 180.

In this example, the PE header 120 comprises fields: Signature 121, MajorVersion 122, MinorVersion 123, SizeOfCode 124, SizeOfInitdData 125, SizeOfUnInitdData 126, EntryPoint 127, BaseOfCode 128, BaseOfData 129, ImageBase 130, SectionAlignment 131, FileAlignment 132, MajorOSVersion 133, MinorOSVersion 134, MajorImageVersion 135, MinorImageVersion 136, MajorSubVersion 137, MinorSubVersion 138, Win32Version 139, ImageSize 140, HeaderSize 141, CheckSum 142, Subsystem 143, DllChar 144, StackReserveSz 145, StackCommitSz 146, HeapReserveSz 147, BeapCommitSz 148, LoaderFlags 149, and NumberOfRVASz 150. In this example, the PE header 120 may comprise 108 bytes.

In existing systems, the ImageBase 130 is typically set to address 0x00000000 for the base address of each image. The actual base image address is reset to the next available base address upon loading. An image is read and decompressed, the base address reset and then loaded into memory. The next image is decompressed and the base address is set for the next available boundary address, and so on, in a serial fashion. In other words, in a usual firmware build, the ImageBase 130 is not set, or set to a default, and the firmware core will load the image at a location that makes sense based on the image size and available memory.

Embodiments of the present invention utilize the ImageBase address 130 to store a base address before decompressing and loading the image. When the images are created, before compressing and storing in FLASH memory, the developer knows the ultimate size of the image and can determine in advance where the images should be loaded. Thus, serial decompression and loading will no longer be necessary. This encoding enables multiple agents to be used in parallel to decompress and load images from the FLASH memory, thereby reducing boot time. The developer, or automated compilation tool, sets the ImageBase for each driver image so that the agents can predictably place the image in the appropriate region if memory.

The PE/COFF Specification published by Microsoft Corporation (§3.4.2) defines the ImageBase variable as "Preferred address of first byte of image when loaded into memory; must be a multiple of 64K. Other boundary multiples may be possible for other architectures. The default for DLLs is 0x10000000. The default for Windows CE EXEs is 0x00010000. The default for Windows NT, Windows 95, and Windows 98 is 0x00400000." Existing systems use this default and reset the actual ImageBase only after serial loading to the next available 64K region.

Figure 2:
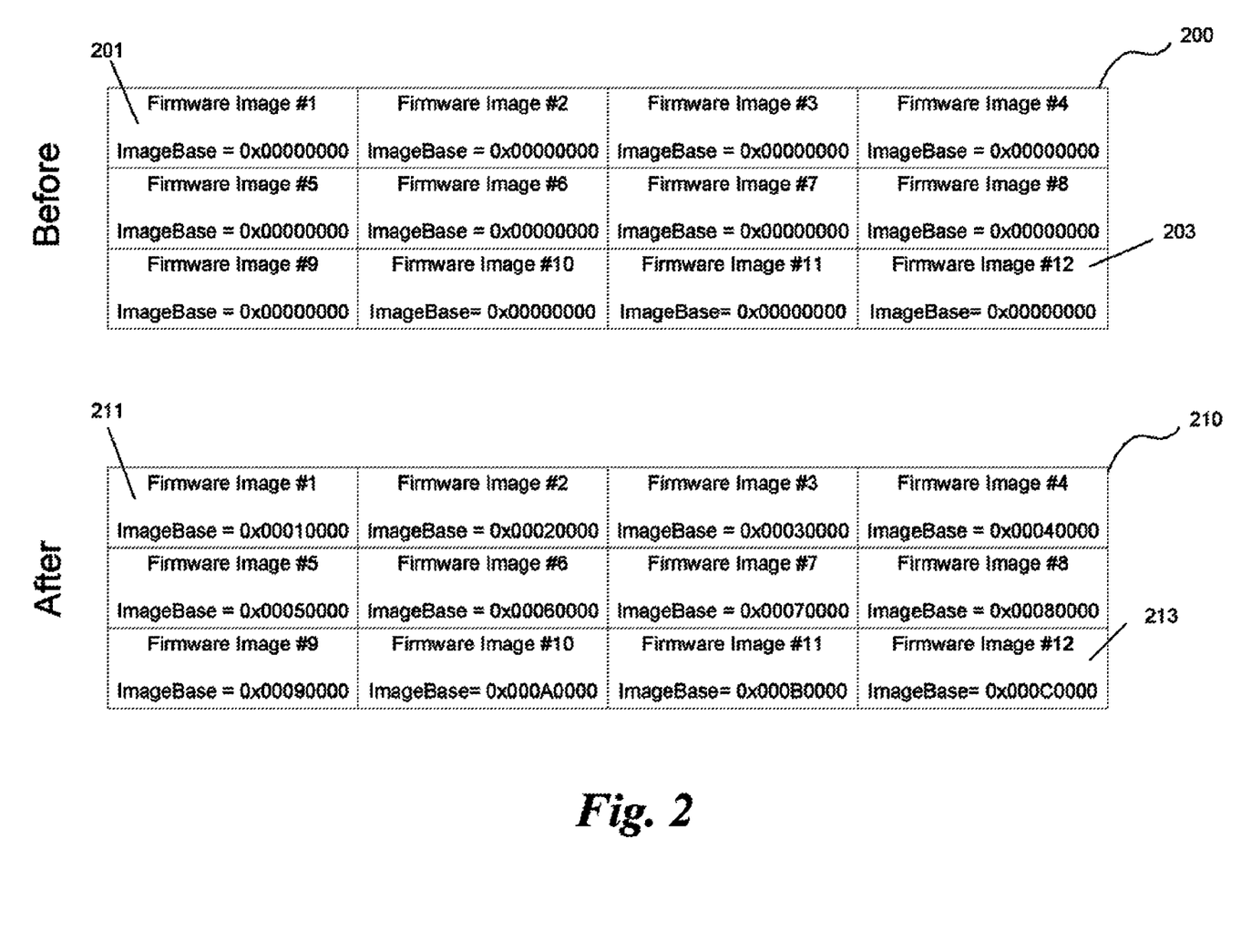
FIG. 2 illustrates the difference in the firmware images between existing systems and using embodiments of the invention.

FIG. 2 illustrates the difference in the firmware images between existing systems ("before") and using embodiments of the invention ("after"). The images in the "before" view 200 are all loaded into FLASH memory with the ImageBase set as 0x0000000. For instance, firmware image #1 (201) has an ImageBase of 0x0000000; firmware image #12 (203) has an ImageBase of 0x00000000, as well as all intermediate firmware images. The ImageBase variable in each image is updated when the image is actually loaded into system memory, after decompression. In contrast, the images in the "after" view 210, as generated according to embodiments of the invention, have the ImageBase preset and stored with the image in FLASH memory. For instance, firmware image #1 (211) has an ImageBase of 0x00010000 and firmware image #12 (213) has an ImageBase of 0x000C0000.

Figure 3:
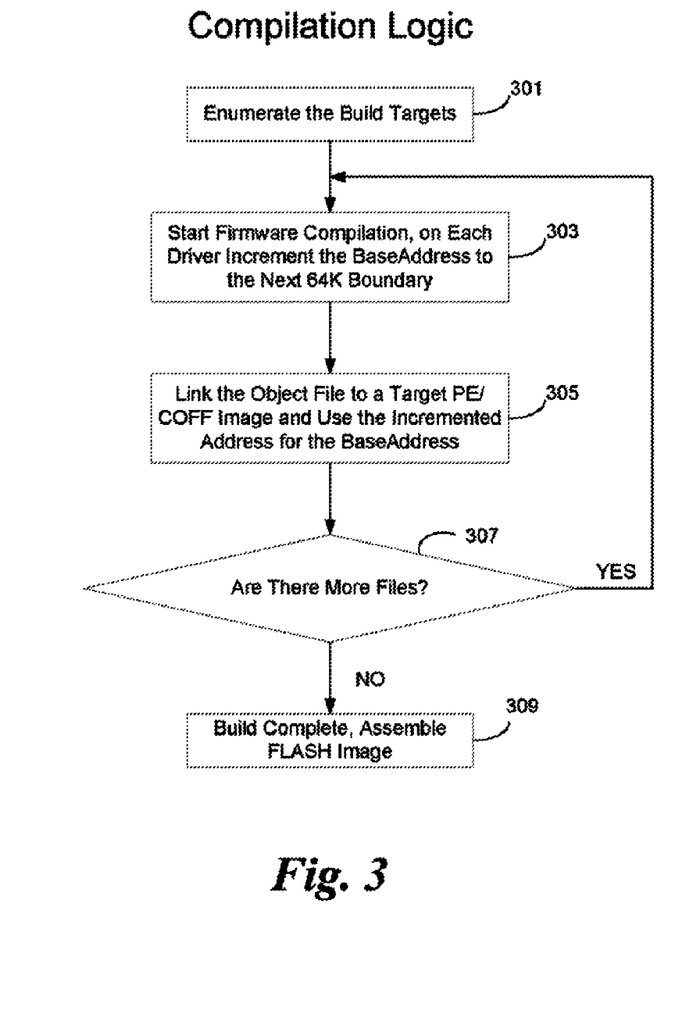
FIG. 3 is a flow diagram illustrating a method for generating firmware images to be stored in the FLASH or other firmware memory, according to an embodiment of the invention.

FIG. 3 is a flow diagram illustrating a method for generating firmware images to be stored in the FLASH or other firmware memory, according to an embodiment of the invention. All of the build modules for a platform are enumerated in block 301 to prepare for generating the image. Firmware compilation is commenced in block 303. A driver or other firmware component is compiled, and the base address is incremented to the next available 64K boundary. The object file is linked to a target PE/COFF image, in block 305, and the incremented address is used for the base address and written into the firmware image as the ImageBase 130. If there are more files to compile, as indicated in block 307, then processing continues with blocks 303 and 305. If there are no more files to compile, then the build is completed; the images are then assembled and written to the FLASH memory or other non-volatile firmware memory in block 309.

Figure 4:
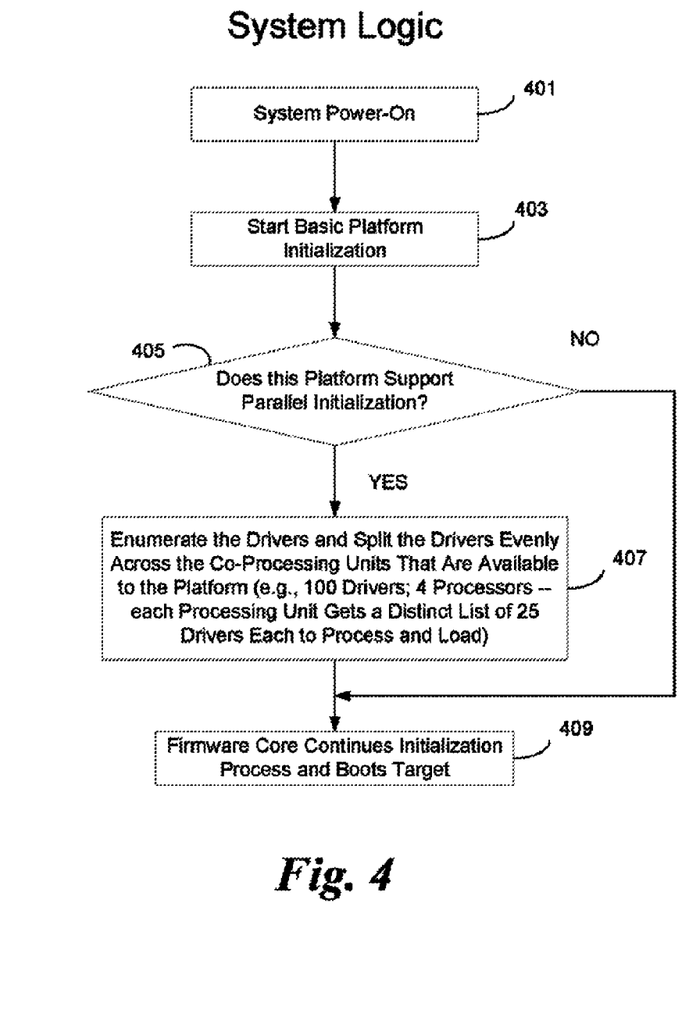
FIG. 4 is a flow diagram of an exemplary method for parallelizing the decompression and load phase of boot, according to an embodiment of the invention.

FIG. 4 is a flow diagram of an exemplary method for parallelizing the decompression and load phase of boot, according to an embodiment of the invention. The platform is powered on in block 401. The platform may be a multi-processor, multi-core, embedded partition architecture, have active management technology, or comprise any other architecture where processes can run in parallel. Basic platform initialization begins in block 403. If the platform does not support parallelization of tasks, as determined in block 405, then the platform will initialize serially, as in the prior art, and proceed to block 409. Serial initialization may ignore data in the ImageBase and reset the base address before loading the images into system memory, as do legacy systems In existing systems, the ImageBase is set to a default value and unused until reset, so the process will function properly, even with images that have been created using embodiments of the invention.

The drivers are enumerated and split, or distributed, the across the co-processing units or multiple processors in block 407. In embodiments of the invention, each processor will process the same number of drivers, or images, as other processors. However, if the platform has inherent knowledge that some processors and busses are slower or faster than others, the number of images processed by each processor may vary based on a weighting value. It is fairly simple to determine how many images are to be processed and loaded, as the FLASH memory has the equivalent of a directory, so that the number of images may be counted by the core firmware module. For instance, if 100 images are present on a platform with four processing units, each processing unit may receive a distinct list of 25 drivers/images to process and load into system memory.

Once all of the drivers/images have been decompressed and loaded into system memory, the firmware core may continue the initialization process and boot the target platform, in block 409.

Figure 5:
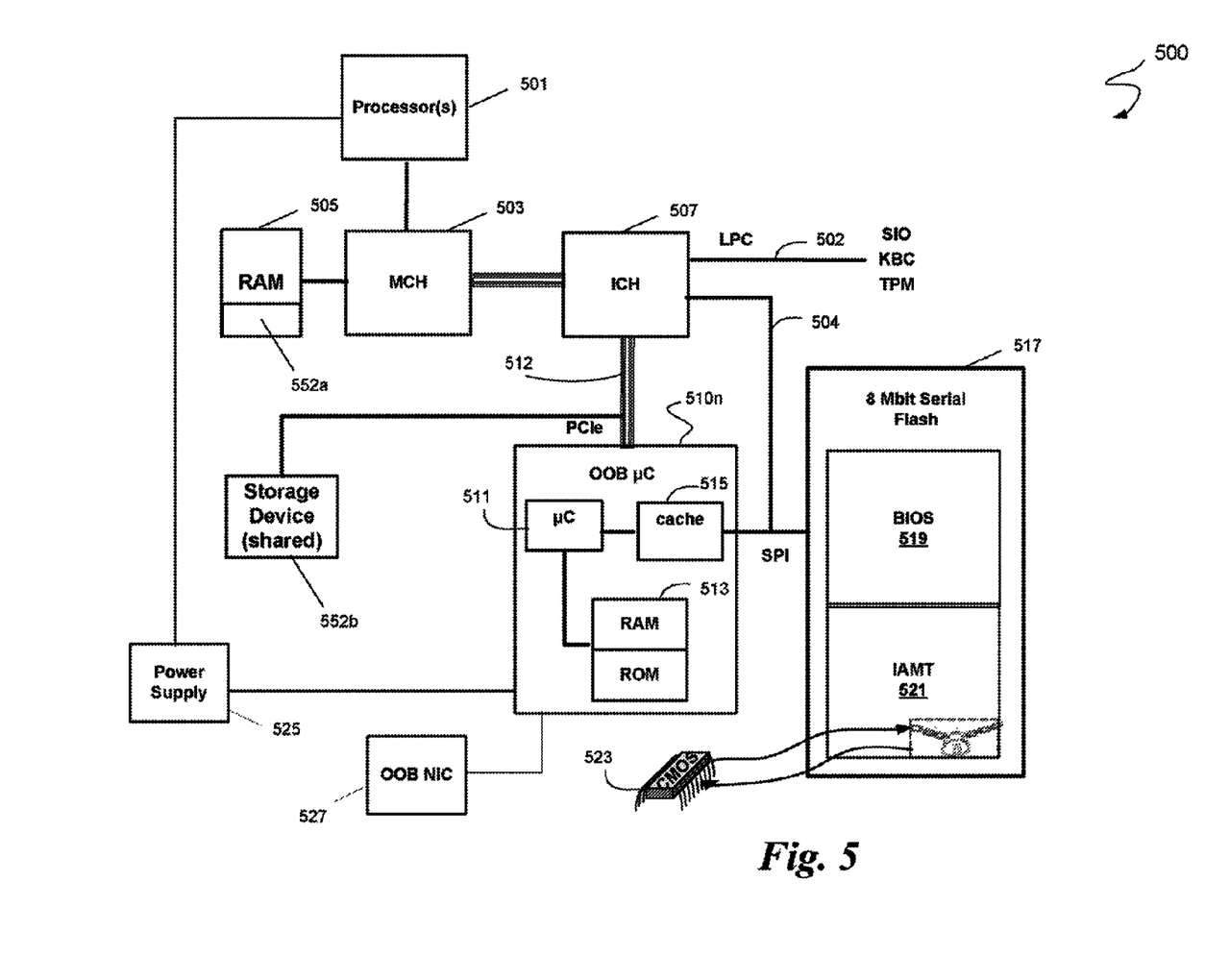
FIG. 5 is a block diagram illustrating features of a platform having an out-of-band microcontroller (OOB μcontroller) on which embodiments of the invention may be implemented.

FIG. 5 is a block diagram illustrating features of a platform having an out-of-band microcontroller (OOB μcontroller) on which embodiments of the invention may be implemented. A platform 500 comprises a processor 501. The processor 501 may be connected to random access memory 505 via a memory controller hub 503. Processor 501 may be any type of processor capable of executing software, such as a microprocessor, digital signal processor, microcontroller, or the like. Though FIG. 5 shows only one such processor 501, there may be one or more processors in the platform 500 and one or more of the processors may include multiple threads, multiple cores, or the like.

The processor 501 may be further connected to I/O devices via an input/output controller hub (ICH) 507. The ICH may be coupled to various devices, such as a super I/O controller (SIO), keyboard controller (KBC), or trusted platform module (TPM) via a low pin count (LPC) bus 502. The SIO, for instance, may have access to floppy drives or industry standard architecture (ISA) devices. In an embodiment, the ICH is coupled to non-volatile memory via a serial peripheral interface (SPI) bus 504. The non-volatile memory may be FLASH memory or static random access memory (SRAM), or the like. An out-of-band (OOB) μcontroller 510n may be present on the platform 500. The OOB μcontroller 510n may connect to the ICH via a bus 512, typically a peripheral component interconnect (PCI) or PCI express bus. The OOB μcontroller may also be coupled with the non-volatile memory store (NV store) 517 via the SPI bus 504. The NV store 517 may be FLASH memory or static RAM (SRAM), or the like. In many existing systems, the NV store is FLASH memory.

The OOB μcontroller 510n may be likened to a "miniature" processor. Like a full capability processor, the OOB μcontroller has a processor unit 511 which may be operatively coupled to a cache memory 515, as well as RAM and ROM memory 513. The OOB μcontroller may have a built-in network interface 527 and independent connection to a power supply 525 to enable out-of-band communication even when the in-band processor 501 is not active.

In embodiments, the processor has a basic input output system (BIOS) 519 in the NV store 517. In other embodiments, the processor boots from a remote device (not shown) and the boot vector (pointer) resides in the BIOS portion 519 of the NV store 517. The OOB μcontroller 510n may have access to all of the contents of the NV store 517, including the BIOS portion 519 and a protected portion 521 of the non-volatile memory. In some embodiments, the protected portion 521 of memory may be secured with Intel® Active Management Technology (iAMT). In an embodiment, the portion 521 of the NV store is protected from access by the firmware based on chipset selections in a base address register (BAR). More information about iAMT may be found on the public Internet at URL www*intel*com/technology/manage/iamt/.

Since the BIOS portion 519 of non-volatile memory may be modified by the OS or applications running within the OS, it may be vulnerable to malicious tampering. The protected area of memory 521, available only to the OOB μcontroller, may be used to store critical boot vector information without risk of tampering. The only way to access the OOB μcontroller side of the NV store 517 is through verification via a proxy through the OOB μcontroller, i.e., signature authentication or the like. Embodiments of the present invention may utilize a hardware protected region 521 of the non-volatile memory 517 and make the protected region inaccessible to the OS.

In some embodiments, a CMOS chip 523 accommodates systems with legacy firmware. In these legacy systems, boot settings may be stored on the CMOS in proprietary formats, rather than in a NV store like FLASH memory. A snapshot of CMOS settings may be stored in a known location. Some embodiments may have FLASH memory 517 and CMOS 523.

In an embodiment, implementation of "mailboxes" to pass messages and data between the in-band (host processor communication) and out-of-band processor is according to techniques discussed in U.S. patent application Ser. No. 10/964,355, entitled "BUS COMMUNICATION EMULATION" to Rothman et al. and filed on Oct. 12, 2004.

The OOB μcontroller 510n may be operated to store a "message" containing a directive in a memory shared by the OOB μcontroller 510n and a processor of the computer system such as the processor 501 of the host computer 500. In the illustrated embodiment, the host computer 500 includes a shared memory 552 which is accessible by both the processor 501 and the OOB μcontroller 510n. The shared memory 552 may reside in a reserved area of RAM 552a, or be located in a separate non-volatile memory store 552b, or the like. The shared memory may be operated as a mailbox for these messages. Thus, in one aspect, the OOB μcontroller 510n may store a message in the shared memory 552 or retrieve a message from the shared memory 552, independently of the status of the host computer 500 including the operating system and the programs. Thus, in the illustrated embodiment, the OOB μcontroller 510n may store or retrieve messages in the shared memory 552 whether the Processor 501 is being initialized or is turned off, or whether the operating system is booting, running, crashed or otherwise.

To facilitate such independent operation, in this example, the controller 510n, the shared memory 552, the local bus 512 and other components as appropriate may be powered independently of the main components of the host computer 500 including the processor 501 and the host memory 505. The shared memory 552 may be non-volatile (NV) memory such as FLASH memory or static random access memory (SRAM). In embodiments described in more detail below, the OOB μcontroller 510n operates independently of the operating system or system start-up program, such that the OOB μcontroller 510n may have its own dedicated control circuitry, firmware, operating system, etc. to control the operations of the OOB μcontroller 510n independently of the status of the remainder of the host computer 500. It is appreciated that the degree of operational independence, if any, of the controller 510n and other components may vary, depending upon the particular application.

In embodiments of the present invention, the OOB μcontroller 510n communicates with the core firmware of the host processor 501, and is given a list of images on the FLASH drive 517 to decompress and load into the host system memory 505. Because the host processor 501 and OOB μcontroller 510n can operate independently, they can both process images from the FLASH memory in parallel. As the images are decompressed, the processor reads the ImageBase address 130 to determine where in memory 505 the image should be loaded. The parallel operations of the two (or more) processors considerably speeds up the overall boot process for the host platform 500.

Similarly, a multi-processor or multi-core platform (with or without an iAMT or baseboard management controller processor) may have parallel decompress/load processes running on the multiple processing units to decompress and load the firmware images in parallel.

Figure 6:
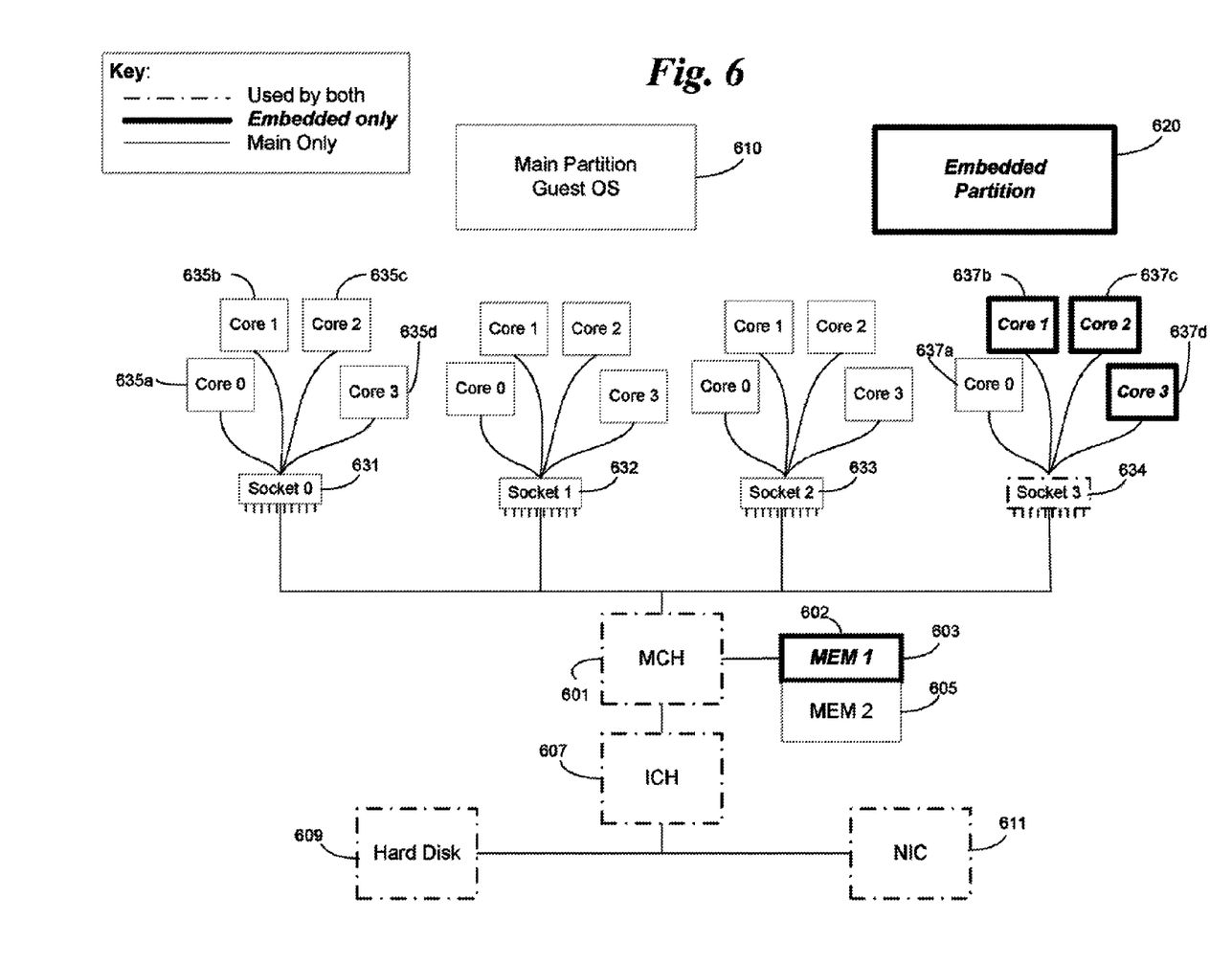
FIG. 6 is a block diagram illustrating an exemplary platform having a platform resource layer architecture on which embodiments of the invention may be implemented.

FIG. 6 is a block diagram illustrating an exemplary platform having a platform resource layer architecture on which embodiments of the invention may be implemented. In a platform resource layer (PRL) architecture, or embedded partition architecture, various components of the platform are enhanced to enable partitioning of processor, memory and other resources. Referring now to FIG. 6, there is shown an exemplary block diagram of a PRL architecture, according to embodiments of the invention. To better illustrate partitioning, components that are available to the main partition 610 are drawn with solid blocks. Components available to the embedded, or system partition 620, are drawn with bold, solid blocks. Components available to both partitions are drawn with a block alternating with dots and dashes.

In this exemplary embodiment, a platform has four multi-core processors in Sockets 0-3 (631-634). While this example shows only four processor sockets, it will be apparent to one of ordinary skill in the art that various configurations of processors and cores may be used to practice embodiments of the invention. For instance. Socket 0 (631) may have four processing cores 635a-d. In essence, in this example, the illustrated embodiment has 16 effective processors on the platform (e.g., four sockets with four cores in each socket). In this example. Sockets 0-2 (631-633) are available only to the main partition 610. Socket 3 (634) is available to both the main partition 610 and to the embedded partition 620. Within Socket 3 (634), core 0 is available only to the main partition 610, and cores 1-3 are available only to the embedded partition 620.

In this embodiment, the platform has a memory controller hub (MCH) 601 (also known as north bridge) coupled to memory 602. Memory 602 may have two partitions MEM1 (603) and MEM2 (605). Memory partition MEM1 (603) is available only to the embedded partition and memory partition MEM2 (605) is available only to the main partition. The chipset containing the MCH is configured to partition the memory using hardware constructs, in contrast to a virtual machine monitor (VMM) solution which uses software constructs. It will be understood that memory 602 may be a hard disk, a floppy disk, random access memory (RAM), read only memory (ROM), FLASH memory, or any other type of medium readable by processor. Memory 602 may store instructions for performing the execution of embodiments of the present invention. While only two partitions are shown in this example, it will be understood that there may be more than one guest OS, each running in its own partition.

The MCH 601 may communicate with an I/O controller hub (ICH) 607, also known as South bridge, via a peripheral component interconnect (PCI) bus. The ICH 607 may be coupled to one or more components such as PCI hard drives, legacy components such as IDE, USB, LAN and Audio, and a Super I/O (SIO) controller via a low pin count (LPC) bus (not shown). In this example, the ICH 607 is shown coupled to a hard disk drive 609 and to a network interface controller (NIC) 611.

The MCH 601 is configured to control accesses to memory and the ICH 607 is configured to control I/O accesses. In an embedded partition architecture, the chipset is configured by the firmware, upon boot, to partition the various resources on the platform. In some cases, there may be only one partition and the platform acts like a legacy platform in most respects. In the example shown, there are two partitions, a main partition 610 and an embedded partition 620. Each partition designated is given a unique partition identifier (ID).

With an embedded partition configuration, when a device sends an alert, the chipset may properly route the alert to the appropriate partition, as this information is encoded at boot time. In a virtualization enabled system, such as using a virtual machine monitor (VMM), the hardware passes the device alerts to the VMM (virtualized devices) and the software routes the information appropriately to the various virtual machines. An embedded partition may act as hardware assisted virtualization.

Parallelization of boot tasks, as discussed above, may be implemented in the BIOS for the embedded partition, or system partition, or in a VMM, as more fully discussed below.

In an embodiment, code for parallelizing initialization is embodied within a VMM which controls all guest virtual machines (VMs) and guest operating systems (OS's) running on the platform. In an embodiment, each virtual machine executes in a different computing unit. In another embodiment, the code for parallelizing initialization is embodied in a privileged partition, process or hypervisor that controls I/O requests for individual OS's. In an embodiment, the VMM, or at least a portion thereof is implemented as part of the BIOS. Thus, the VMM will execute as part of the core firmware to control the parallelization of firmware image decompression and load tasks.

For instance, during the initial boot, the first execution of code may be execute-in-place (XIP) on the firmware drive (i.e., FLASH memory). The XIP code may employ cache-as-RAM to execute firmware code in cache, before system memory (RAM) has been initialized. It may be possible for code running in cache-as-RAM to deploy limited virtual machines so that some boot tasks may be run in parallel. This architecture may be more difficult to implement than a boot from BIOS before deployment of a VMM or other virtualization construct. However, embodiments of the invention may be implemented on a variety of architectures, either existing or not yet deployed. Once the firmware images have been constructed with a non-null, or non-default, ImageBase, any number of boot architectures may be implemented to load the images in parallel, at the desired system memory locations (ImageBase address).

Figure 7:
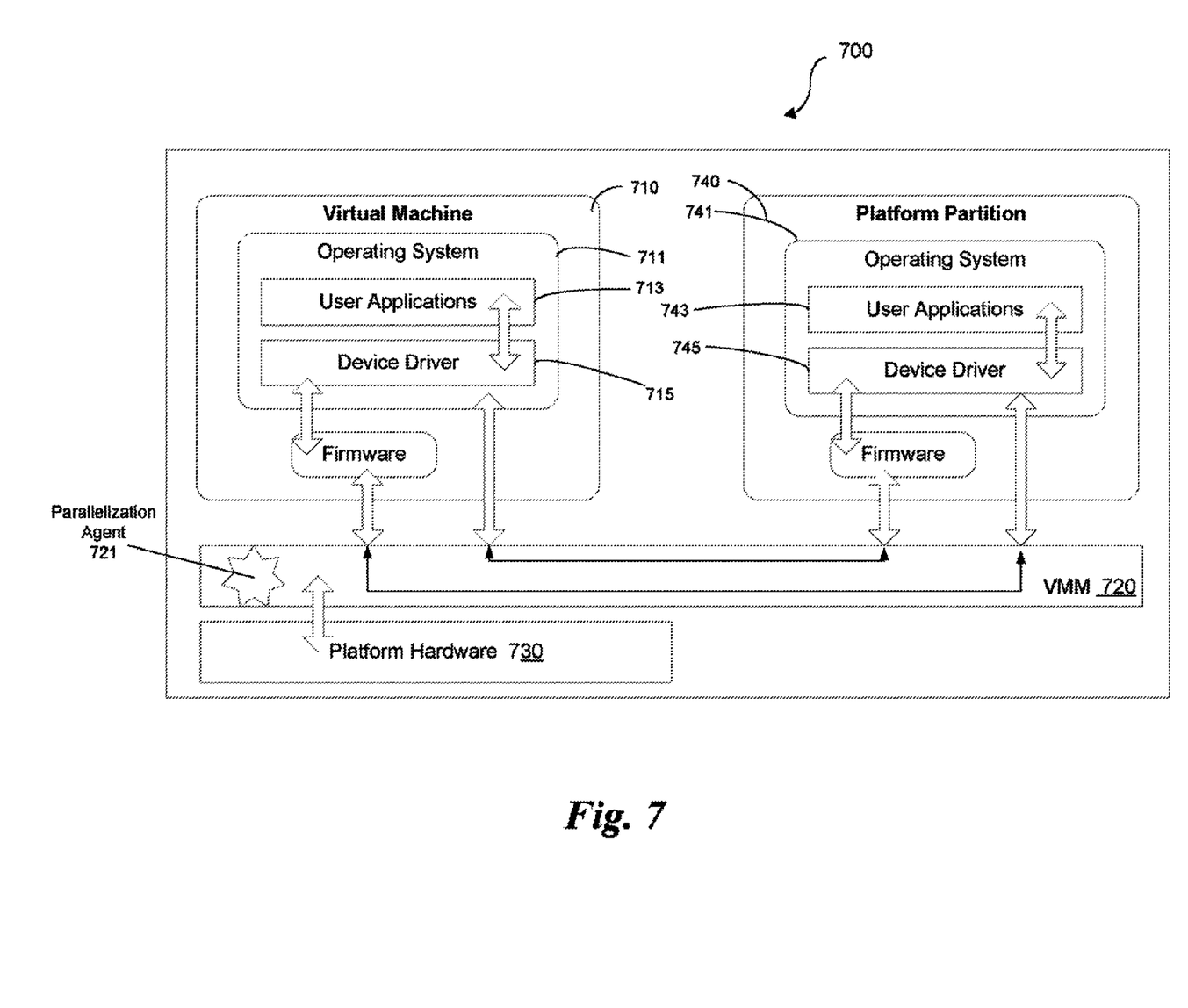
FIG. 7 is a block diagram illustrating an exemplary virtualization platform where a parallelization agent resides in a virtual machine monitor (VMM), according to an embodiment of the invention.

Referring now to FIG. 7, an exemplary virtualization platform where the parallelization agent 721 resides in a VMM is shown. In this exemplary embodiment, a virtual machine (VM) 710 has a guest OS 711. Various user applications 713 may run under the guest OS 711. The OS has device drivers 715 which may be virtualized within the VMM 720. Access to platform hardware 730 will require the use of the VMM. A parallelization agent 721 within the VMM 720 may be launched to divide the FLASH image decompression and loading tasks among various virtual machines (VMs) during initialization of the platform 700.

Similarly, a platform partition, or more privileged partition 740 having its own OS 741, user applications 743, device drivers 745 is shown. This platform partition may also have virtualized devices via the VMM 720.

Embodiments are discussed above, for instance using iAMT microprocessors. In other embodiments, a baseboard management controller (BMC), or other co-processors) on the platform may be used to implement the parallelization of boot tasks, as discussed above. Actual implementations will vary based on the architecture of the platform. Those of ordinary skill in the art should be able to easily adapt the techniques discussed above to various platforms that have architectures comprising multiple computing nodes.

The techniques described herein are not limited to any particular hardware or software configuration; they may find applicability in any computing, consumer electronics, or processing environment. The techniques may be implemented in hardware, software, or a combination of the two, but will typically be implemented in the system firmware.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, FLASH memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for parallelizing early platform initialization, comprising:
    a platform comprising a plurality of computing nodes;
    a basic input output system (BIOS) to load firmware images from a non-volatile storage medium comprising a boot image having a plurality of firmware images, each firmware image being associated with a unique base address identifying a location in system memory where the firmware image is to be loaded, the BIOS to determine a total number of firmware images on the non-volatile storage medium and to notify at least two computing nodes on the platform of a respective selection of firmware images on the non-volatile storage medium; and
    each of the notified computing nodes to load their respective selection of firmware images during boot, the loading performed by each computing node to be executed in parallel with other computing nodes, where each firmware image is loaded into system memory at the identified associated base address.

2. The system as recited in claim 1, wherein the non-volatile storage medium comprises FLASH memory in a firmware hub.

3. The system as recited in claim 1, wherein the firmware images on the non-volatile storage medium are stored in a compressed format, and wherein the computing nodes decompress each respective selection of firmware images before loading the firmware image into system memory.

4. The system as recited in claim 3, wherein the boot image comprises a portable executable, common object file format (PE/COFF) and where an ImageBase variable in each of the PE/COFF formatted firmware images comprises the unique base address identifying the location in system memory where the firmware image is to be loaded.

5. The system as recited in claim 1, wherein the total number of firmware images in the boot image are to be distributed evenly among the notified computing nodes on the platform for processing during boot.

6. The system as recited in claim 1, wherein the firmware images comprise driver images.

7. A method for parallelizing early platform initialization, comprising:
    enumerating firmware images in a boot image on a non-volatile storage medium during boot of a platform, wherein each firmware image is associated with a unique base address identifying a location in system memory where the firmware image is to be loaded;
    distributing the enumerated firmware images among at least two computing nodes on the platform during boot;
    loading the firmware images into system memory, by the computing nodes to which the respective firmware images have been distributed, wherein each computing node operates in parallel to the other computing nodes loading firmware images.

8. The method as recited in claim 7, wherein firmware images on the non-volatile storage medium are stored in a compressed format, further comprising:
    decompressing the firmware image by the computing node before loading the firmware images into system memory.

9. The method as recited in claim 7, wherein the boot image comprises a portable executable, common object file format (PE/COFF) and where an ImageBase variable in each of the PE/COFF formatted firmware images comprises the unique base address identifying the location in system memory where the firmware image is to be loaded.

10. The method as recited in claim 7, wherein the firmware images comprise driver images.

11. A computer readable storage medium having instructions for parallelizing early platform initialization, the instructions stored therein, that when executed on a machine, cause the machine to:
    enumerate firmware images in a hoof, image on a non-volatile storage medium during boot of a platform, wherein each firmware image is associated with a unique base address identifying a location in system memory where the firmware image is to be loaded;

distribute the enumerated firmware images among at least two computing nodes on the platform during boot;

load the firmware images into system memory, by the computing nodes to which the respective firmware images have been distributed, wherein each computing node operates in parallel to the other computing nodes loading firmware images.

12. The medium as recited in claim 11, wherein firmware images on the non-volatile storage medium are stored in a compressed format, further comprising instructions to:

decompress the firmware image by the computing node before loading the firmware images into system memory.

13. The medium as recited in claim 11, wherein the boot image comprises a portable executable, common object file format (PE/COFF) and where an ImageBase variable in each of the PE/COFF formatted firmware images comprises the unique base address identifying the location in system memory where the firmware image is to be loaded.

14. The medium as recited in claim 11, wherein the firmware images comprise driver images.

* * * * *